Oct. 9, 1928.

H. A. FOOTHORAP 1,687,332

CONTINUOUS FEED PLATEN

Filed May 29, 1925    16 Sheets-Sheet 3

Inventor
Harry A. Foothorap
By
Attorney

Oct. 9, 1928. 1,687,332
H. A. FOOTHORAP
CONTINUOUS FEED PLATEN
Filed May 29, 1925 16 Sheets-Sheet 4

Inventor
Harry A. Foothorap
By
Attorney

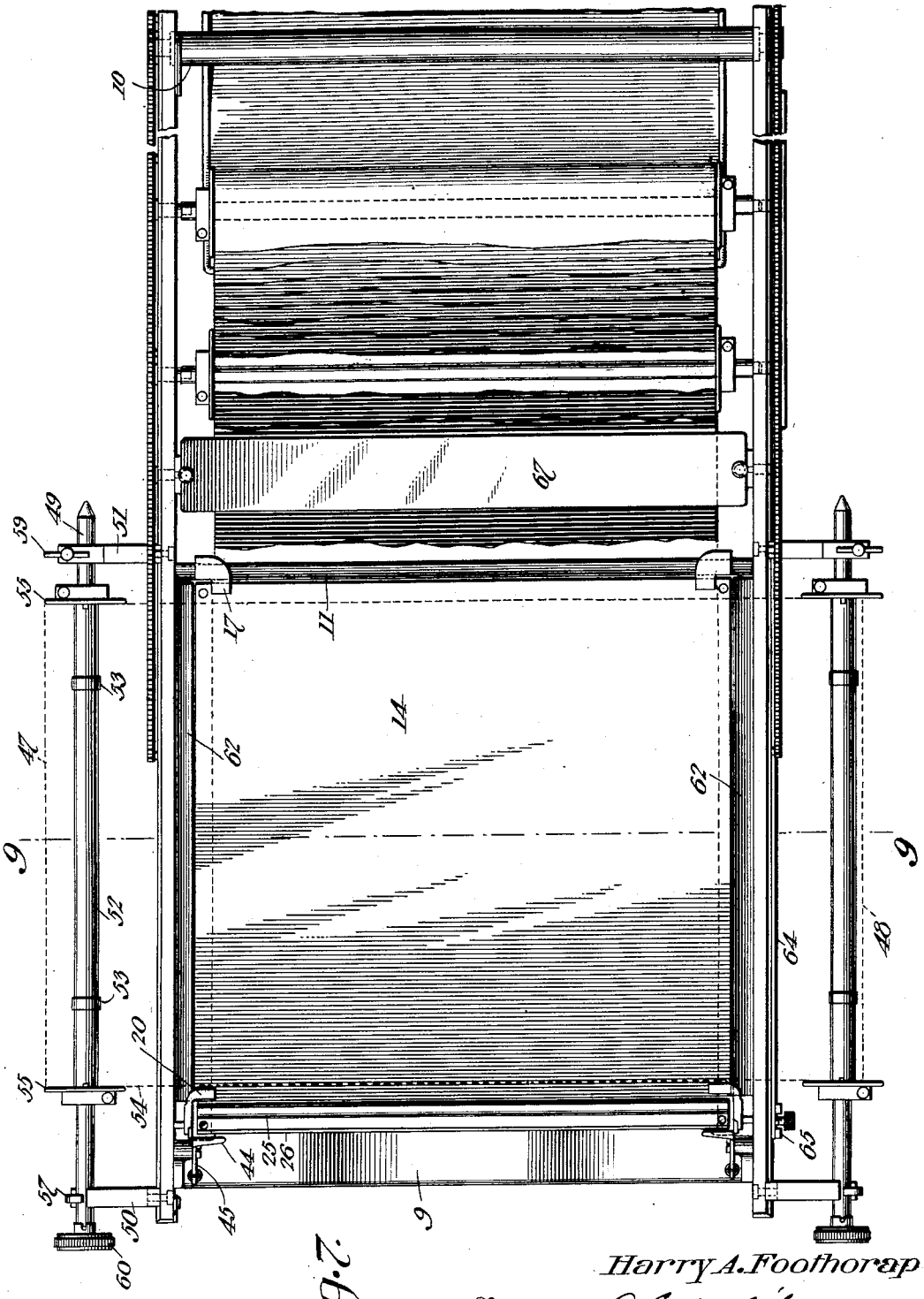

Oct. 9, 1928.
H. A. FOOTHORAP
1,687,332
CONTINUOUS FEED PLATEN
Filed May 29, 1925     16 Sheets-Sheet 6
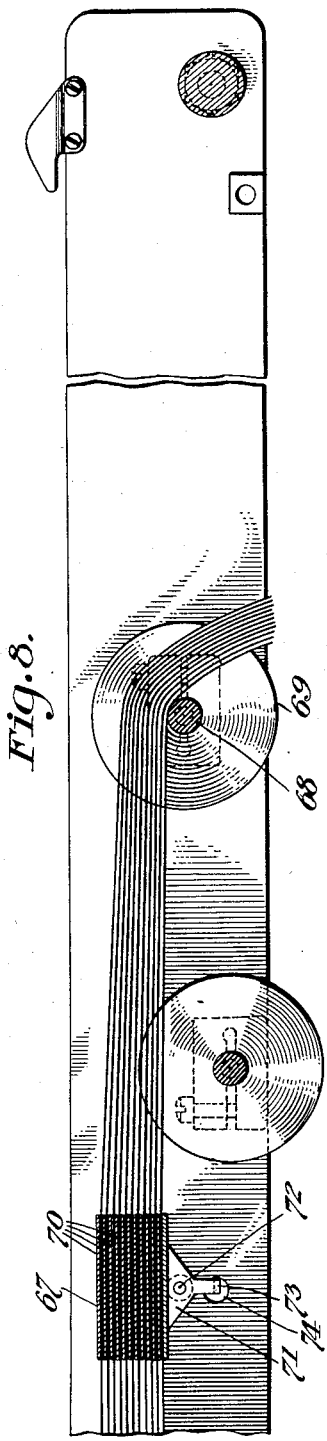
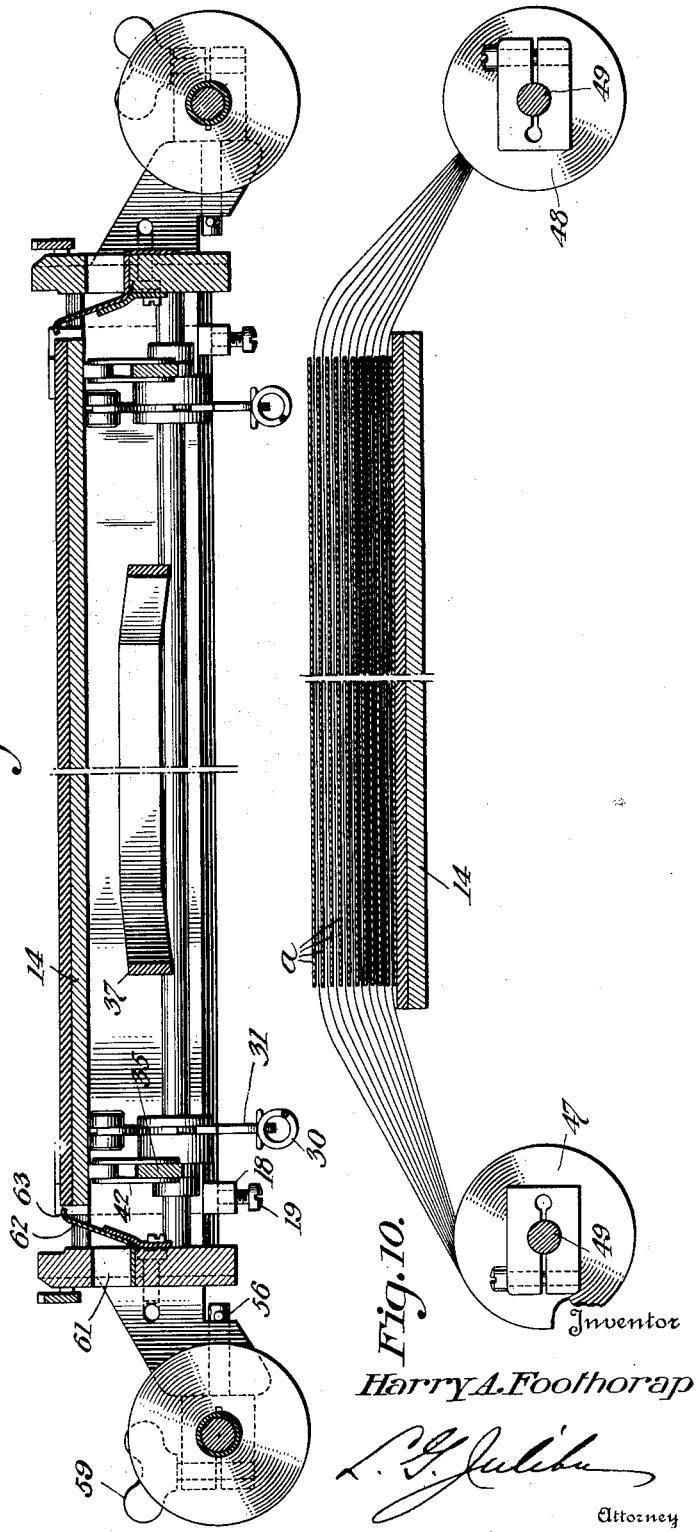
Inventor
Harry A. Foothorap
Attorney Oct. 9, 1928.
H. A. FOOTHORAP
CONTINUOUS FEED PLATEN
Filed May 29, 1925
1,687,332
16 Sheets-Sheet 7
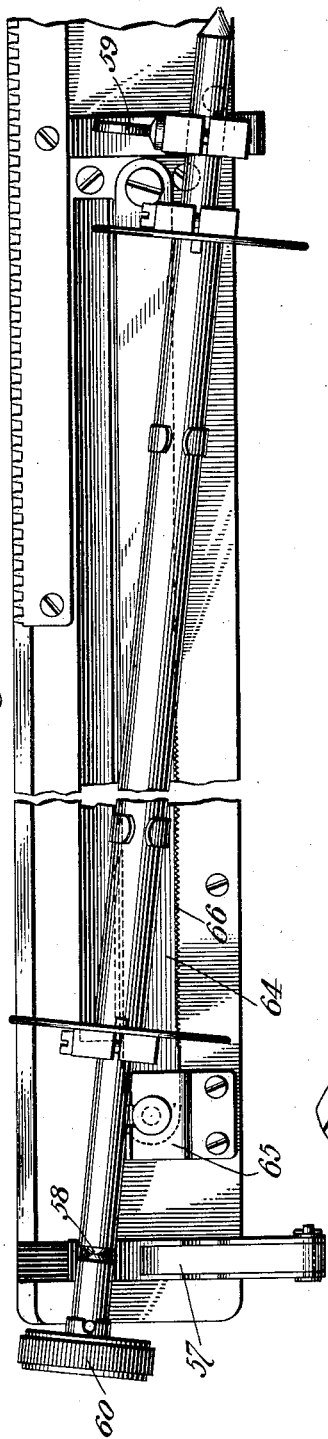
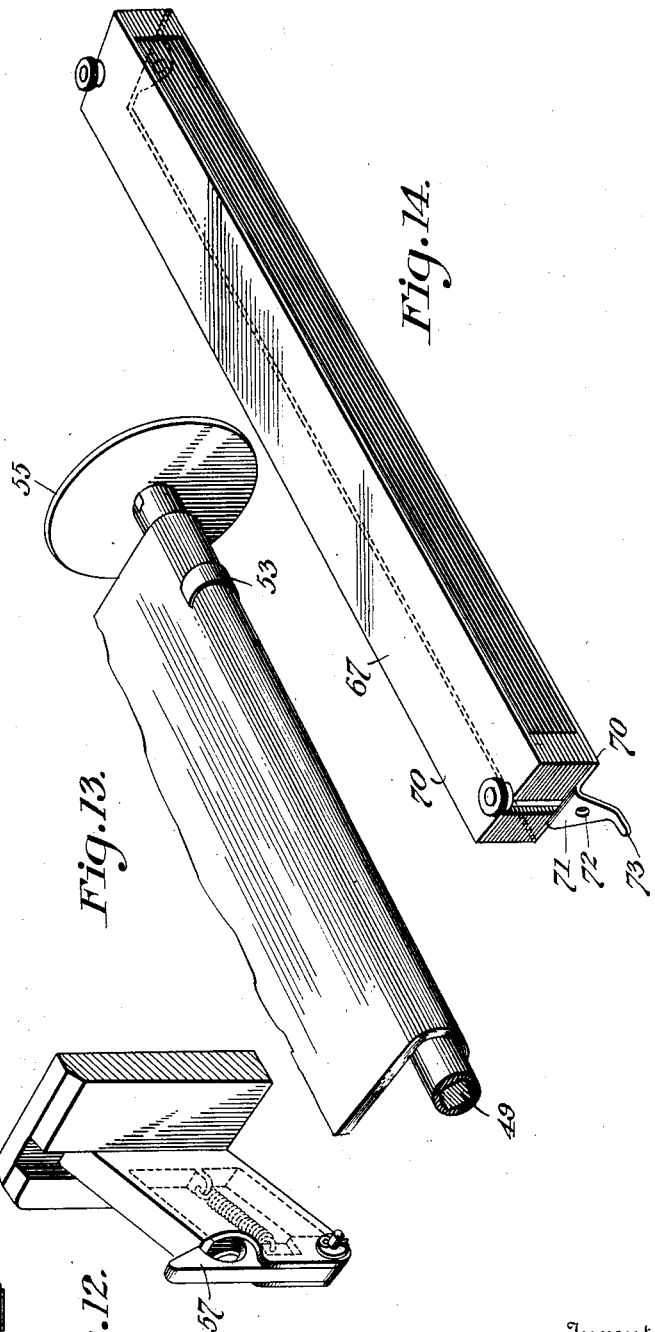
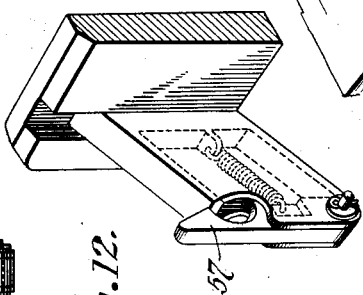
Inventor
*Harry A. Foothorap*
By
Attorney

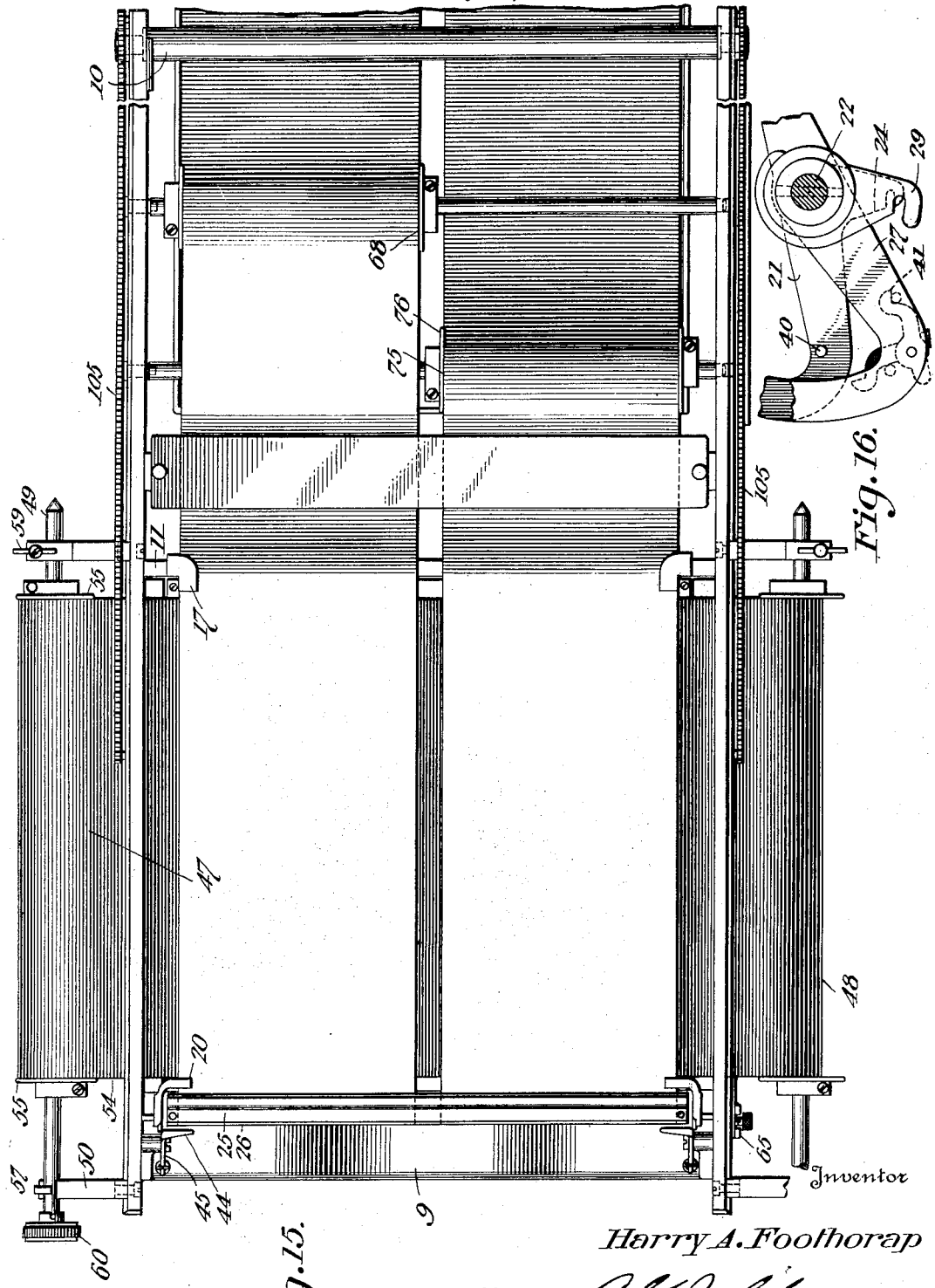

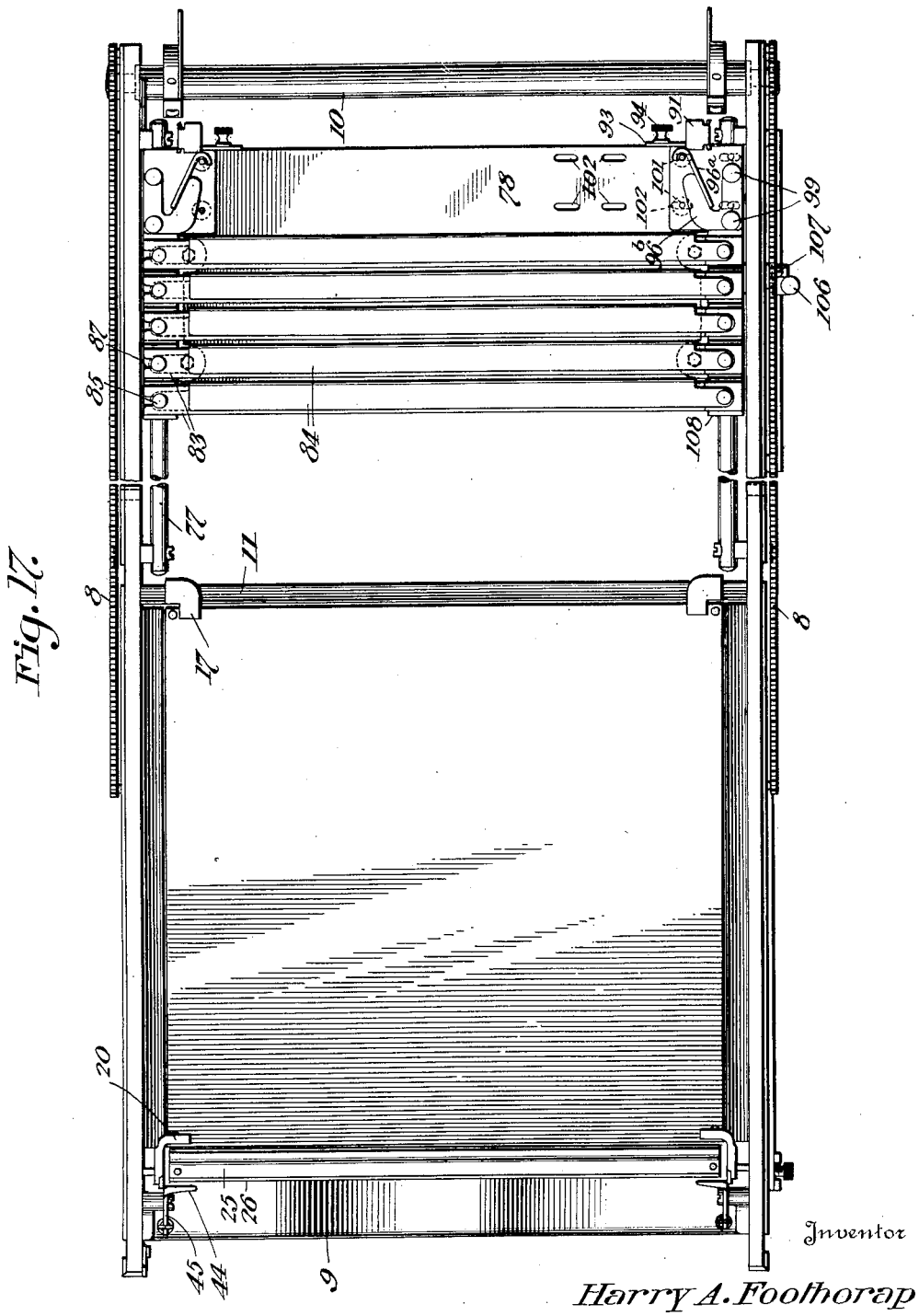

Oct. 9, 1928.
H. A. FOOTHORAP
1,687,332
CONTINUOUS FEED PLATEN
Filed May 29, 1925 16 Sheets-Sheet 10
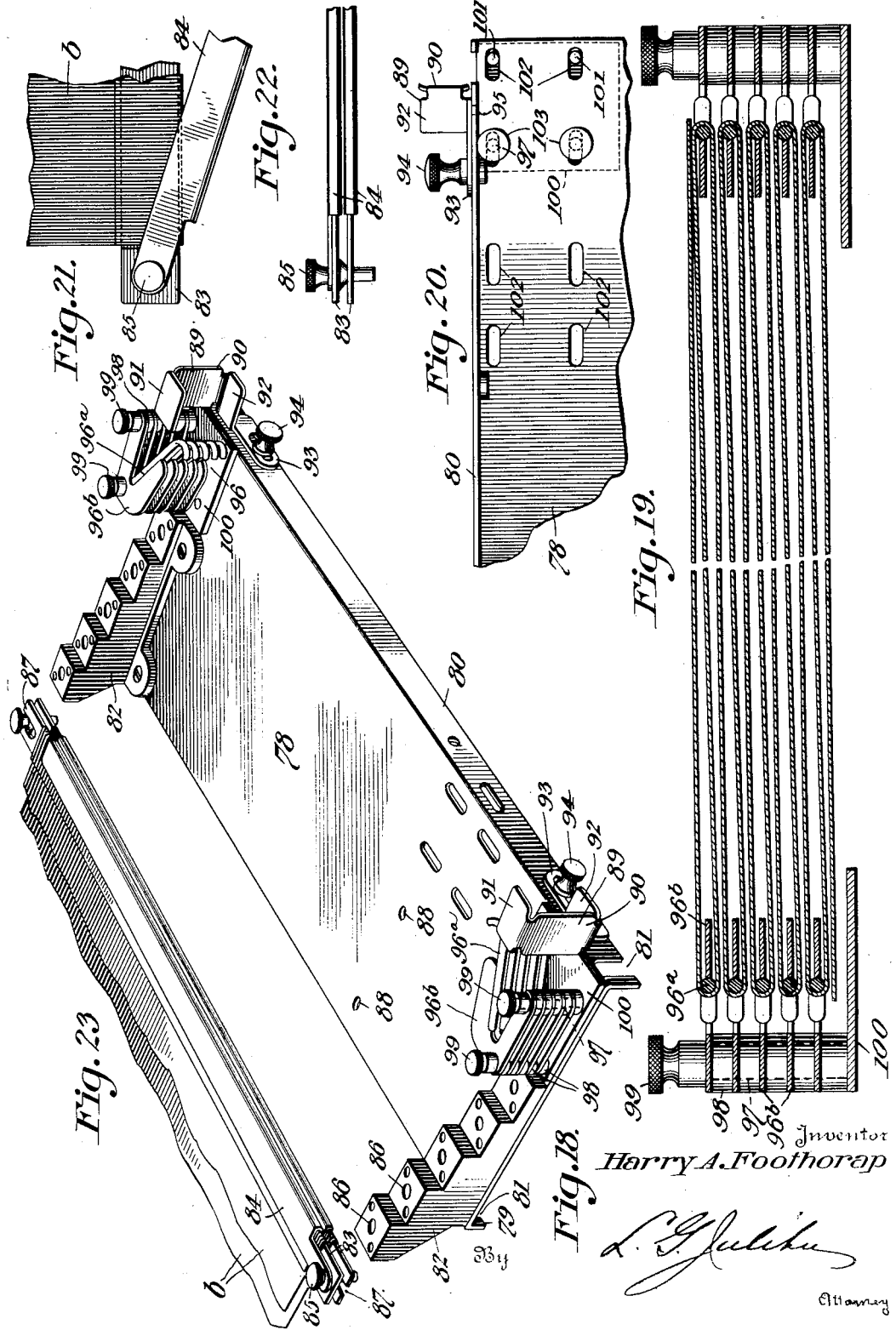
Inventor
*Harry A. Foothorap*

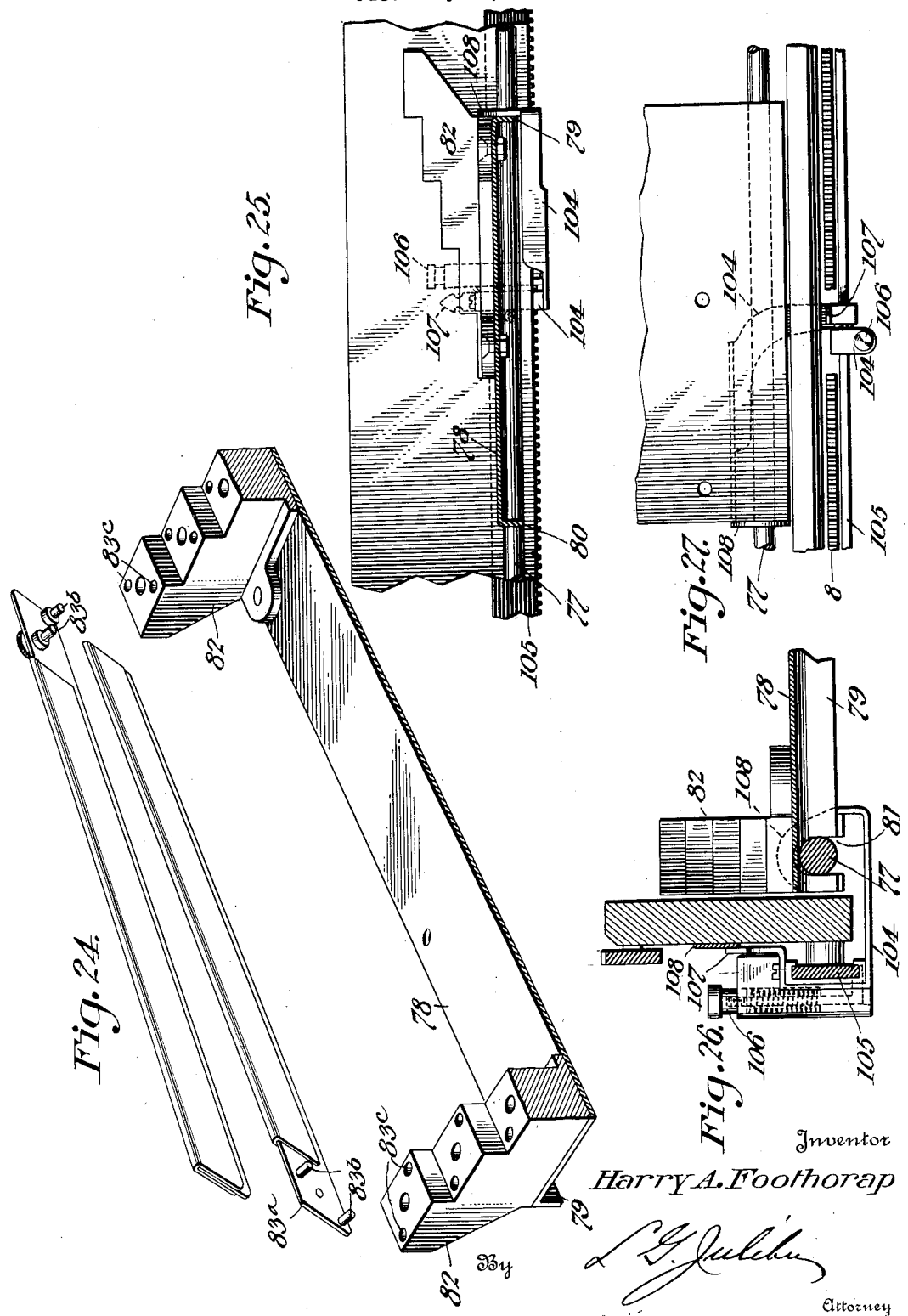

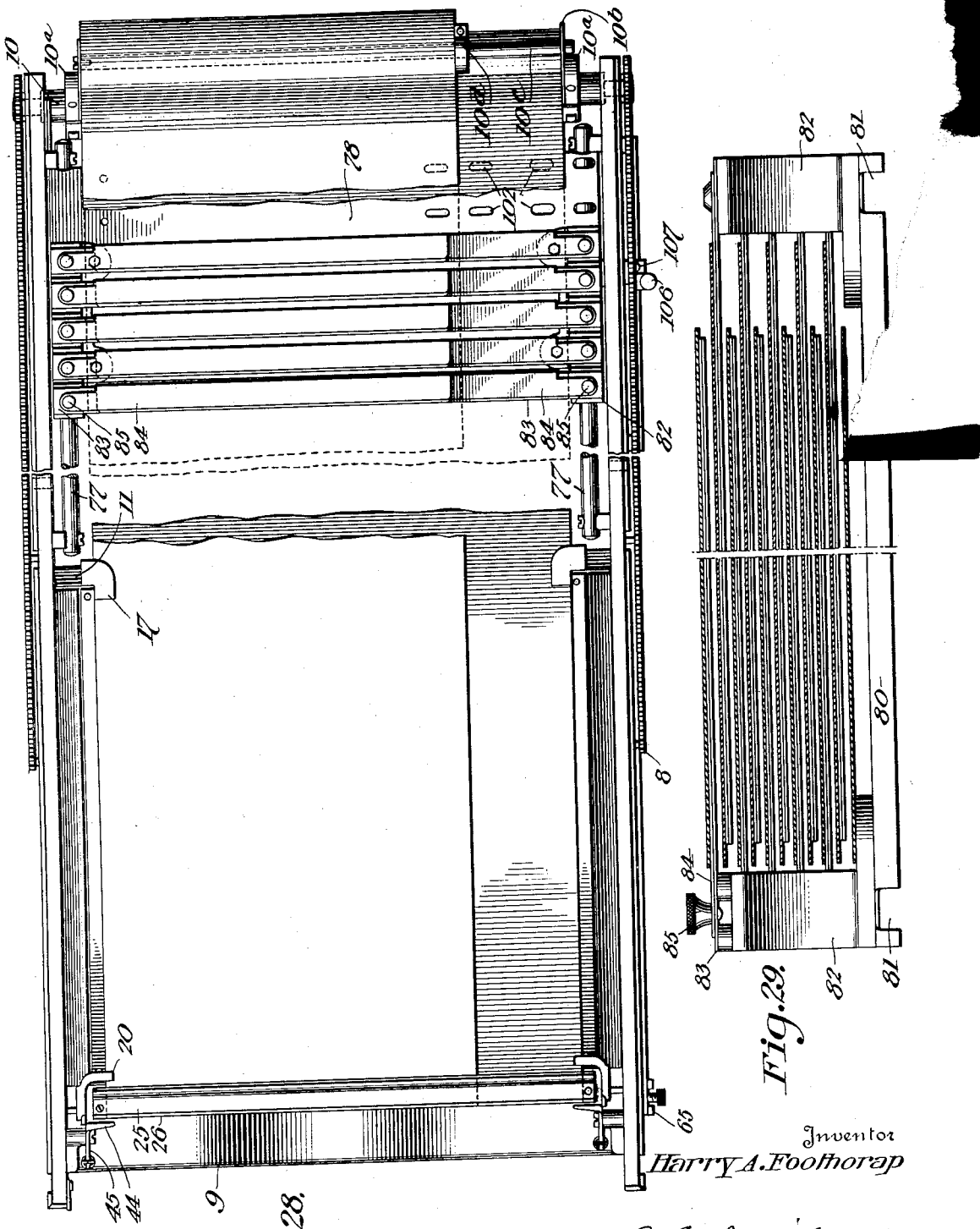

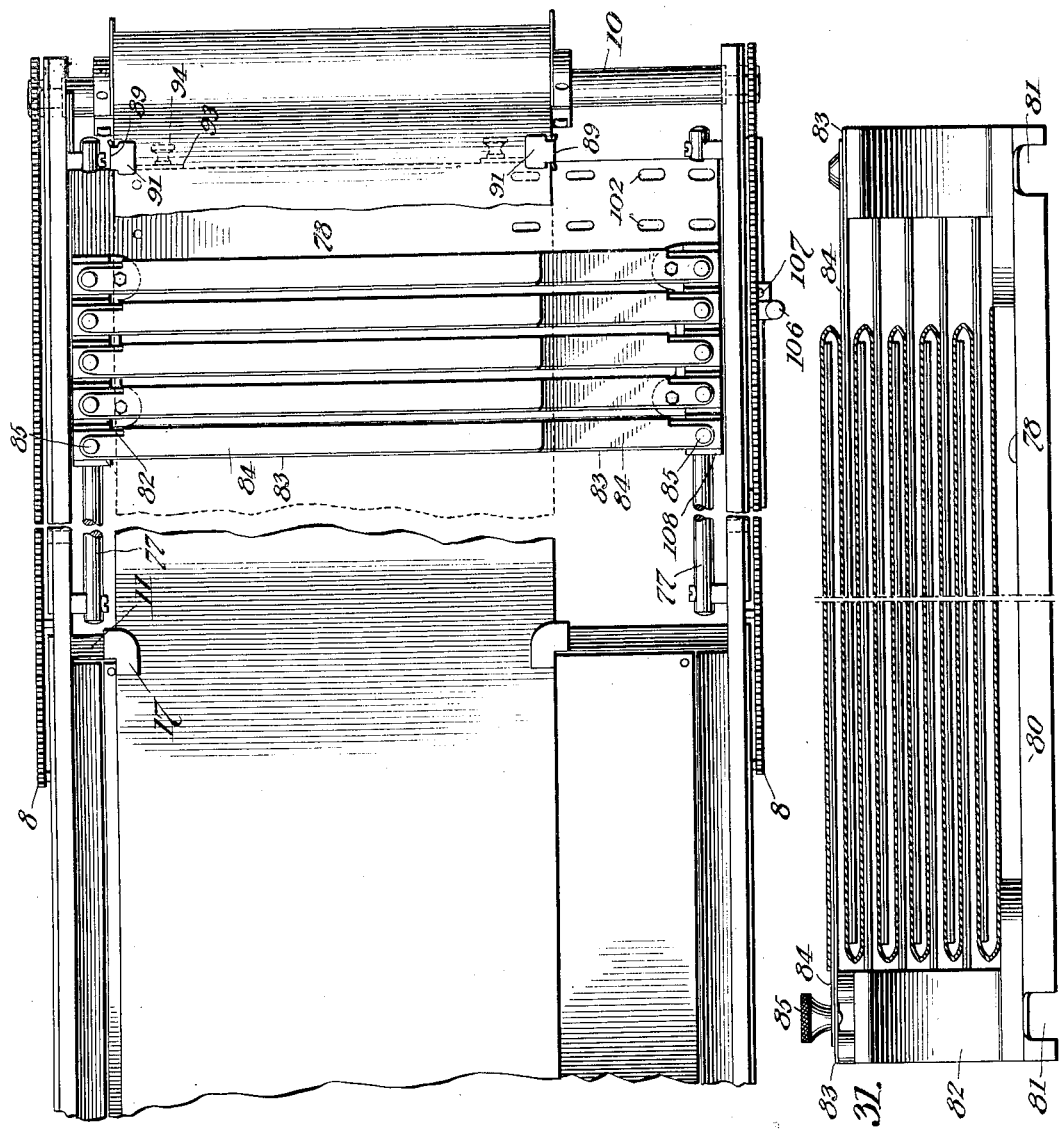

Oct. 9, 1928.
H. A. FOOTHORAP
1,687,332
CONTINUOUS FEED PLATEN
Filed May 29, 1925   16 Sheets-Sheet 14
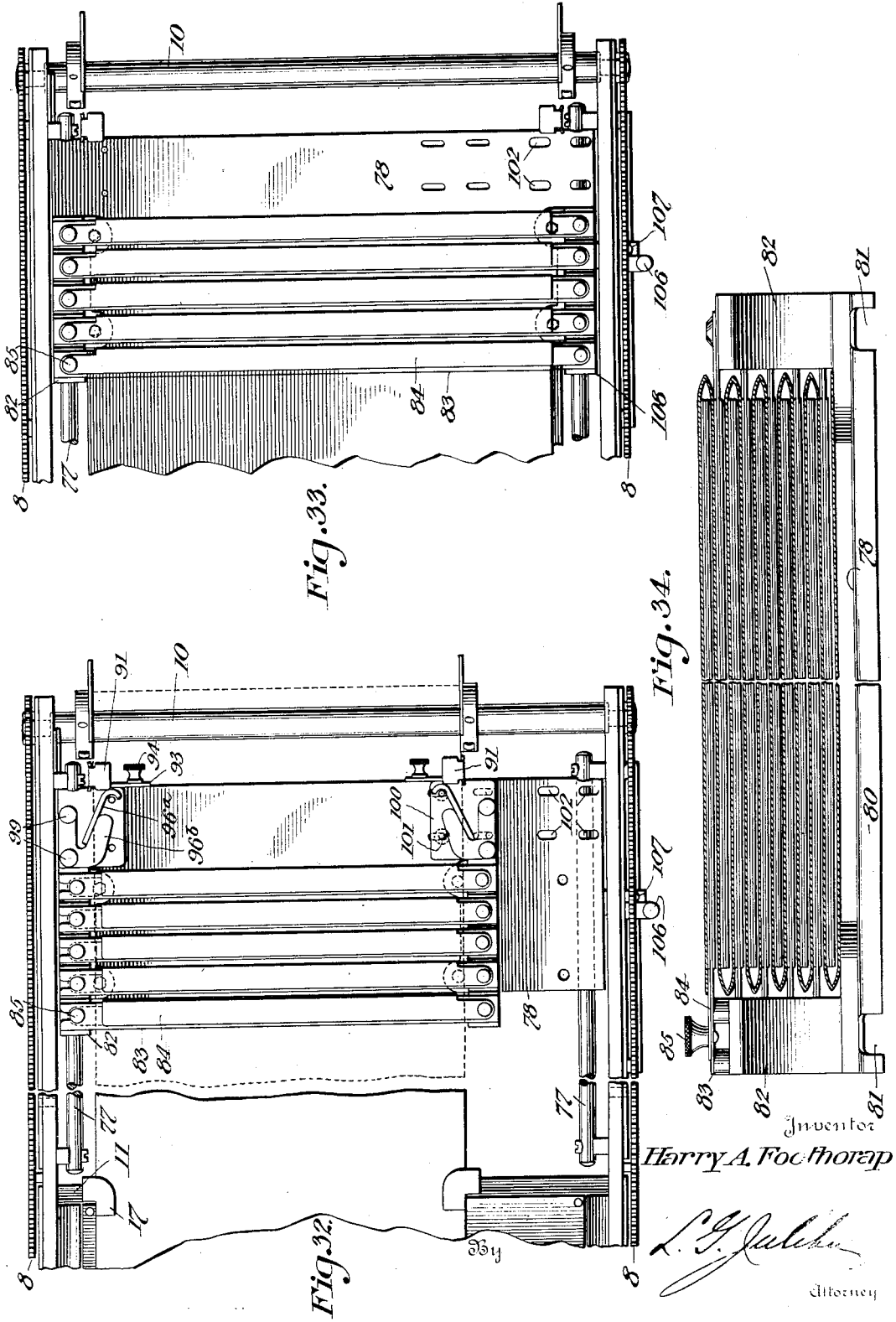
Inventor
Harry A. Foothorap
By
Attorney Oct. 9, 1928.
H. A. FOOTHORAP
1,687,332
CONTINUOUS FEED PLATEN
Filed May 29, 1925   16 Sheets-Sheet 15
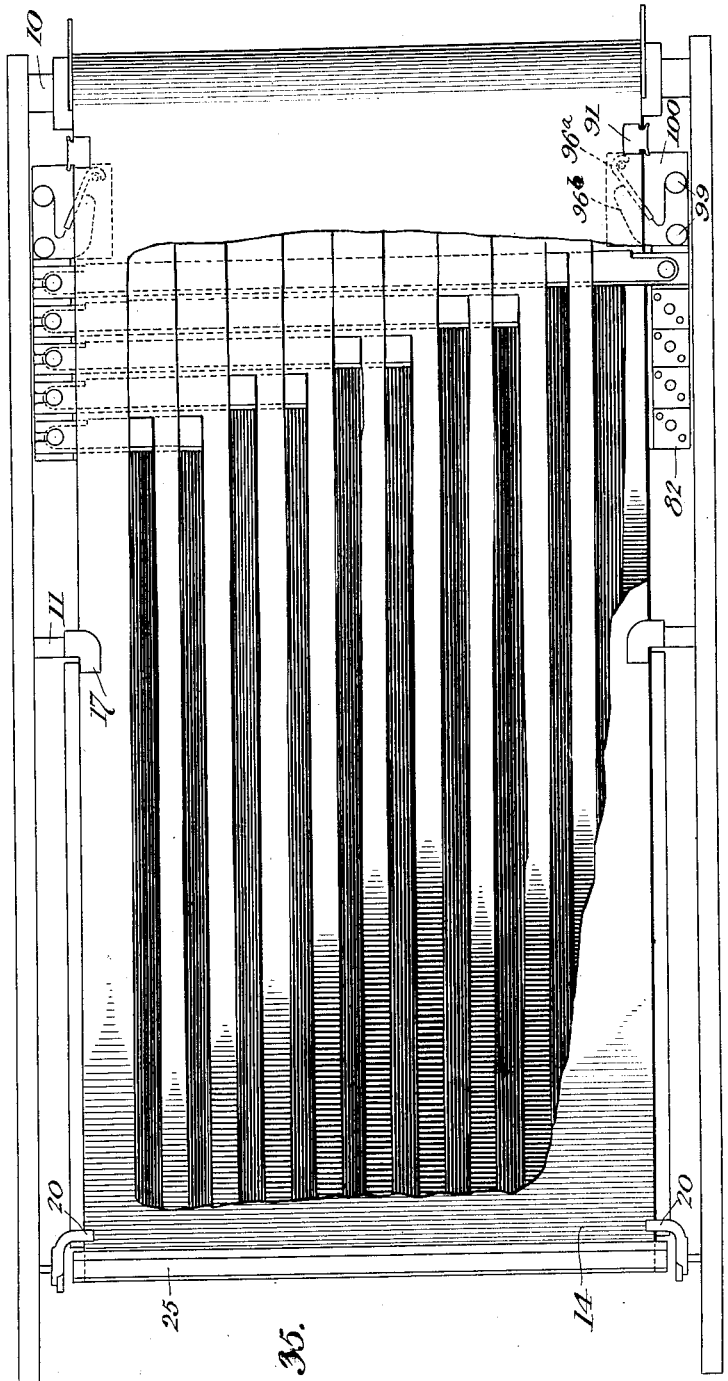
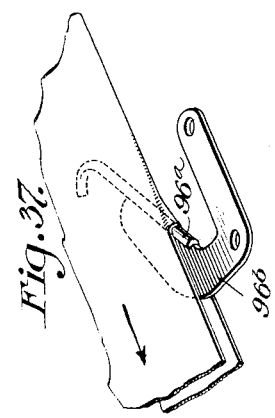
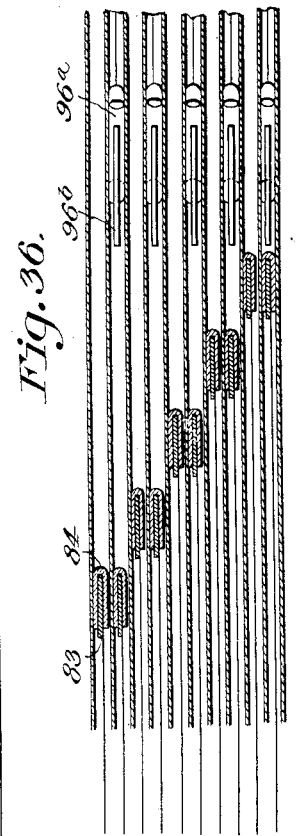
Inventor
Harry A. Foothorap Oct. 9, 1928.
H. A. FOOTHORAP
1,687,332
CONTINUOUS FEED PLATEN
Filed May 29, 1925 16 Sheets-Sheet 16
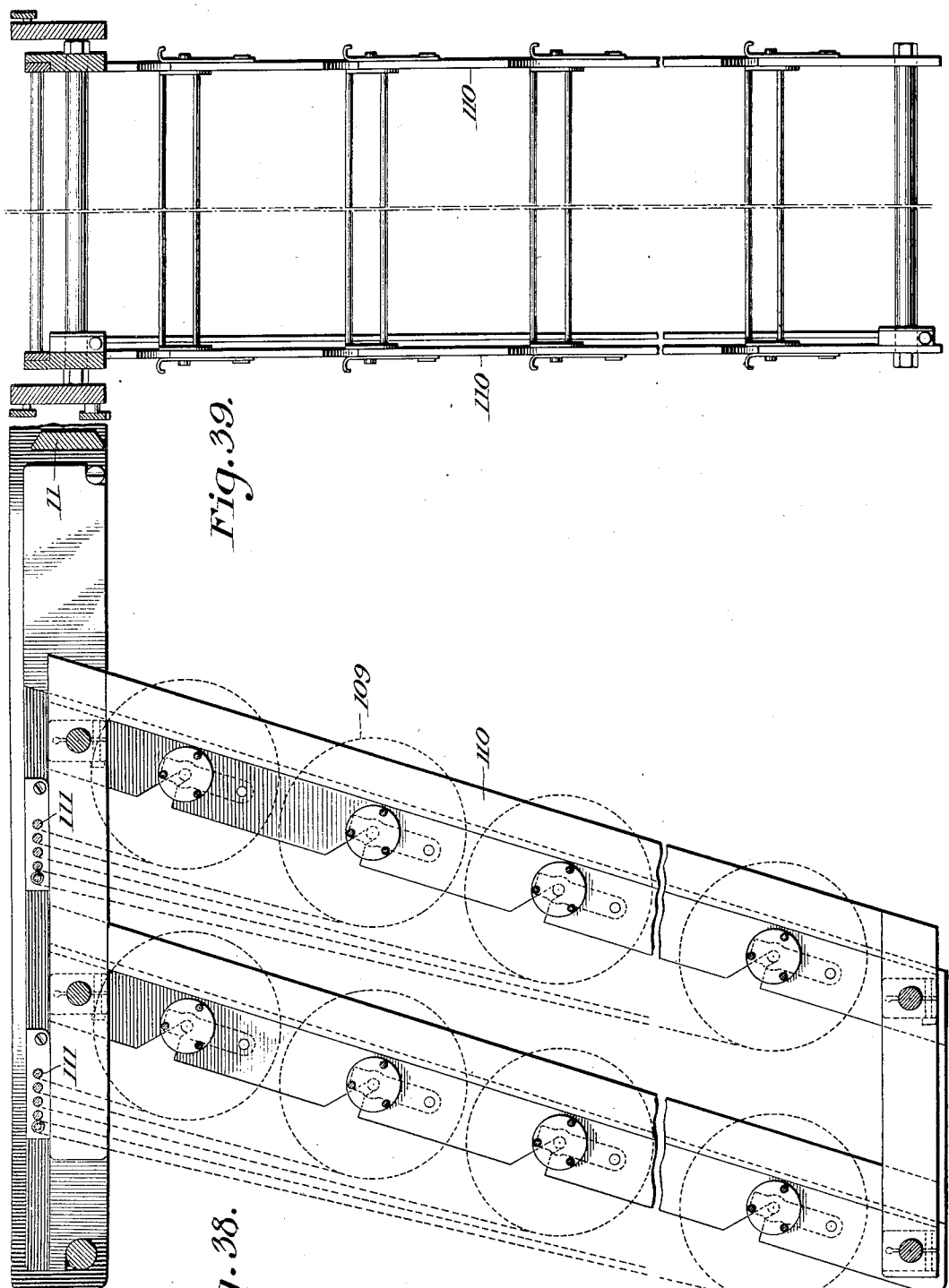

Patented Oct. 9, 1928.

1,687,332

UNITED STATES PATENT OFFICE.

HARRY A. FOOTHORAP, OF HARRISBURG, PENNSYLVANIA, ASSIGNOR TO ELLIOTT-FISHER COMPANY, OF NEW YORK, N. Y., A CORPORATION OF DELAWARE.

CONTINUOUS-FEED PLATEN.

Application filed May 29, 1925. Serial No. 33,797.

This invention relates to a platen and continuous feed equipment therefor, designed to facilitate continuous manifolding.

The object of the invention is to provide a flat platen typewriter with a platen combined with various devices to support, guide, and feed various forms and arrangements of paper and carbon so that the machine can be quickly and conveniently arranged for any of the well-known types of manifolding in which are employed strips of paper led over the platen from rolls, or what is known as superfold strips which are led from a storage receptacle in which they are folded along opposite transverse folds, or fanfold strips, which are folded along opposite longitudinal folds, provision being made for the employment of either transverse carbons or longitudinal carbons, slitters for the separation of fanfold sheets along the lines of the folds, a smoothing device for breaking down transverse creases in the webs, and means for facilitating the feeding of the paper and carbon and for severing the same.

In the accompanying drawings:

Figure 1 is a side elevation of a manifolding machine, with certain of the parts broken away.

Figure 1ª is a view of a paper web receptacle and a portion of a fanfold web extended therefrom, and ready to be fed to the machine.

Figure 7 is a plan view of the platen showing the set-up for a single superfold group with transverse carbon.

Figure 8 is a large longitudinal section of the rear portion of Figure 7.

Figure 9 is a transverse section on the line 9—9 of Figure 7.

Figure 10 is a more or less diagrammatic view showing the inter-leaving of the paper and carbon webs above the platen.

Figure 11 is a side elevation of the platen frame, intended more particularly to illustrate the manner of mounting the carbon roll.

Figure 12 is a detailed perspective view of a front carbon roll mounting.

Figure 13 is a detailed perspective view showing the means of attaching the end of the transverse carbon to a roll.

Figure 14 is a perspective view of the smoothing device.

Figure 15 is a plan view of a platen set up to handle twin sets of webs with a transverse carbon common to both sets.

Figure 16 is a detailed view of the mechanism connecting the paper knife and the front platen clamps.

Figure 17 is a plan view of the platen with a set-up intended for the accommodation and handling of a fanfold strip of maximum width, floating carbons and slitting means.

Figure 18 is a perspective view of the floating carriage for the carbon fingers and slitters.

Figure 19 is a section through the slitters and fanfold strip.

Figure 20 is a detail of a portion of the carriage.

Figure 21 is a detail showing the manner of securing the end of a floating carbon to a carbon finger.

Figures 22 and 23 are detailed views showing the manner in which a plurality of carbon fingers may be supported by each of the finger steps of the carriage.

Figure 24 is a perspective group of a portion of the carbon carriage and a pair of carbon fingers for use in connection with a fanfold strip which it is desired to leave unslitted so that the set of printed forms, when severed from the strip, will be connected together along the lines of the fanfolds.

Figure 25 is a sectional view showing the manner of mounting the carbon carriage.

Figure 26 is a transverse section of the same.

Figure 27 is a detailed plan view showing the manner of controlling the feed of the carbon carriage when the replacement of the used portion of the carbon is desired.

Figure 28 is a plan view of the platen showing the set-up for two piled sets of superfold strips of different widths with floating carbons.

Figure 29 is a transverse section of Figure 28.

Figure 30 is a plan view of the set-up for a narrow fanfold strip with floating carbons and without slitters.

Figure 31 is a section of the same.

Figure 32 is a plan view of the set-up for a narrow fanfold strip with slitters.

Figure 33 is a plan view of a set-up for a wide fanfold strip with the slitters.

Figure 34 is a transverse section of Figure 33 with the fanfold strip in place.

Figure 35 is a plan view of the set-up for a wide fanfold strip, having twice as many layers as there are steps on the carbon carriage, successive layers and carbons being broken away to show the inter-leaving arrangement when two carbons are mounted on each step.

Figure 36 is a transverse section of the subject-matter of Figure 35.

Figure 37 is a detailed view of a slitter in action.

Figure 38 is a view of a roll frame secured in the rear portion of the platen frame, and Figure 39 is a sectional elevation of Figure 38.

Figure 1:
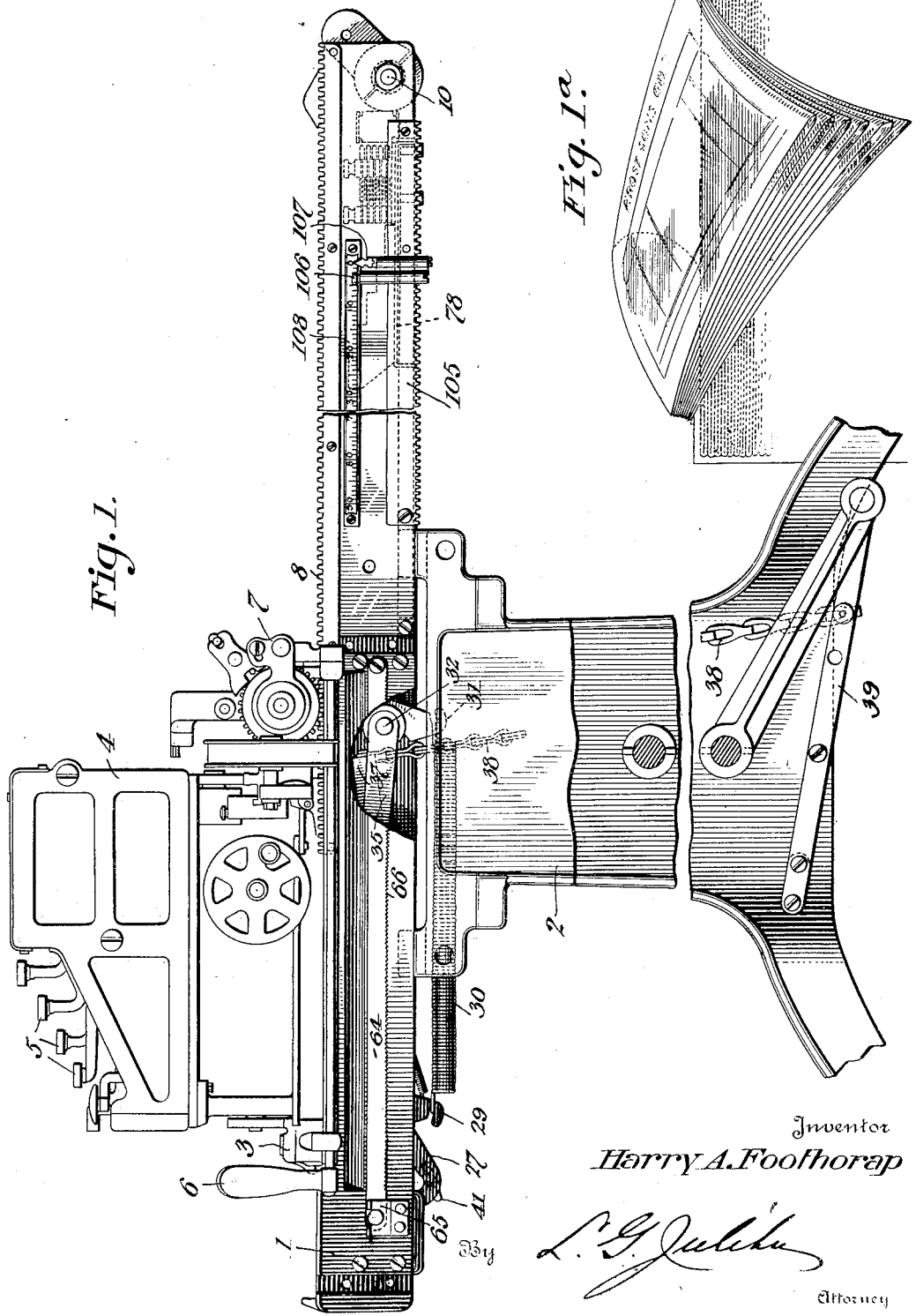

The machine illustrated in Figure 1 of the drawings is the Elliott-Fisher billing and manifolding machine of commerce. It includes a platen frame 1, sometimes carried by a pedestal 2, and supporting in turn a line space frame 3 movable longitudinal of the platen frame 1 and surmounted by the typewriter carriage 4, which moves transversely of the platen on the frame 3 to letter space the matter printed by the manipulation of the printing keys 5 on the carriage 4.

Figure 2:
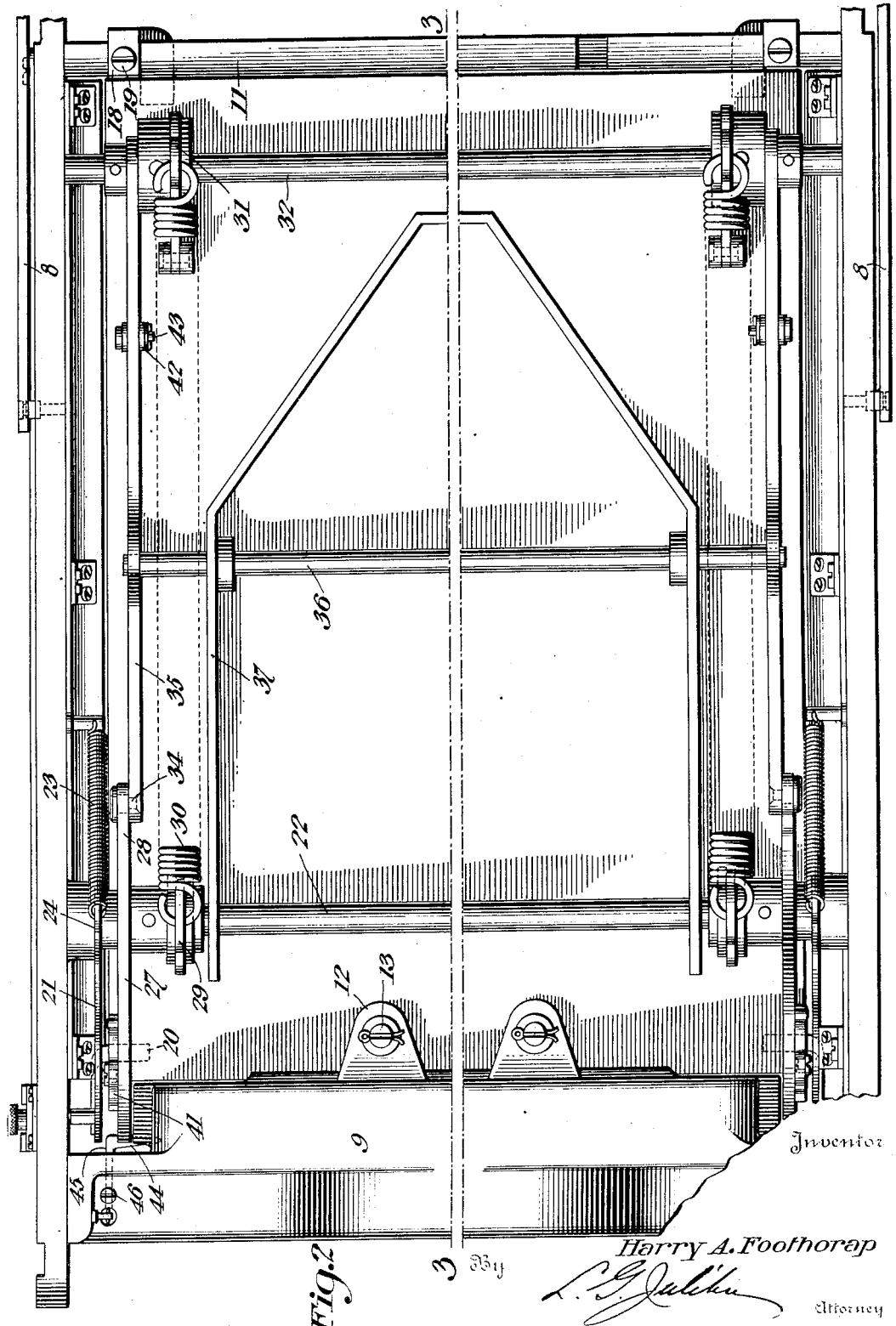
Figure 2 is a bottom plan view of the front portion of the platen frame with the platen and associated parts mounted therein.
Figure 3:
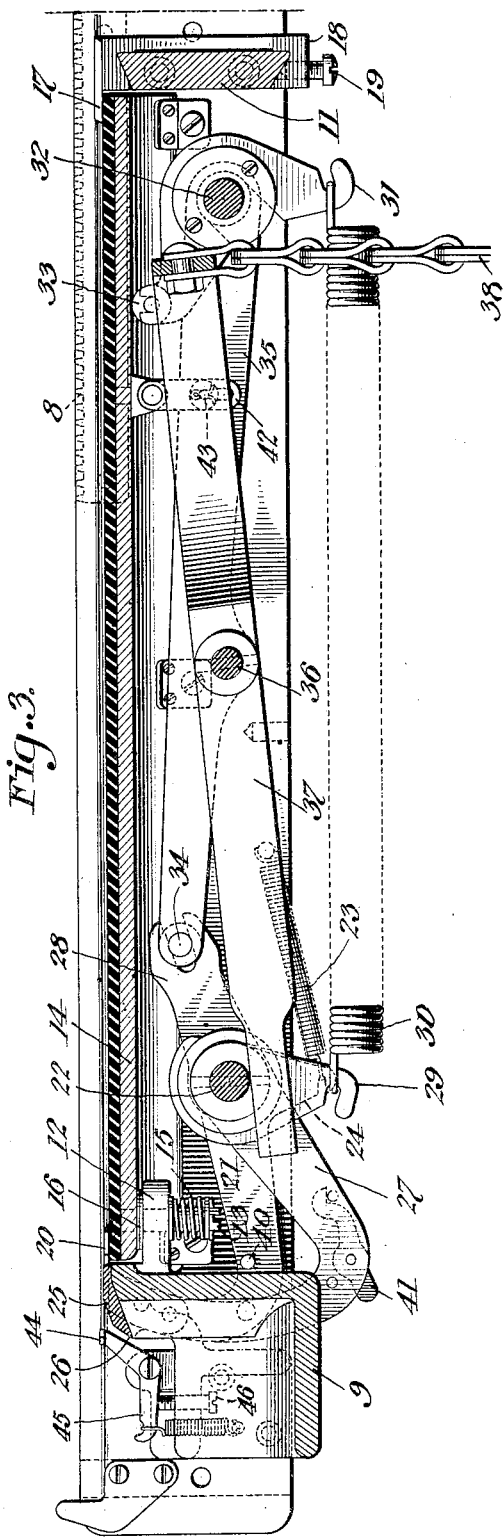
Figure 3 is a longitudinal section on the line 3—3 of Figure 2.

The line space movement of the frame 3 is effected by the manipulation of a line space lever 6, which controls line space mechanism 7, co-acting with the line space feed racks 8, extending along the upper edges of the frame 1. The side members of the frame 1 are connected by a front transverse frame member 9, a rear transverse frame member or bar 10, and an intermediate frame bar 11. The front bar 9 is a casting of the form indicated in Figures 2 and 3, provided with two rearwardly extending platen supporting lugs 12, to receive pins 13 depending from the front end of the flat platen 14 which occupies that portion of the platen frame between the side members thereof, and the frame bars 9 and 11.

Below the lugs 12, the pins 13 are encircled by springs 15 which hold the platen down upon washers 16, interposed between the platen and the lugs, the openings in which latter are slightly larger than the pins to permit the slight movement of the platen at its front end, which is occasioned by the dropping of the rear end of the platen away from rear platen clamps 17, carried by and adjustable upon the bar 11 by means of blocks 18, cut out to receive the bar and retained in their adjusted positions by set screws 19. The blocks 18 serve as guides or gauges for the work, since continuous strips fed to the platen from the rear are guided between the blocks and loose sheets placed on the platen may have their rear edges abutted against the rear edges of the blocks, the clamps 17 in either event serving, when the platen is raised, to clamp the work and hold it securely in place during the recording operation.

Overlying the platen at its front end are front platen clamps 20, carried by angular arms 21, loosely mounted upon a transverse shaft 22, journaled at the opposite sides of the platen frame. The clamps 20 are held depressed by springs 23, secured to the platen frame and to short arms 24 fixed to the arms 21. Co-acting with the upper edge of the front bar 9, is a form cutter and clamp 25 extended entirely across the front edge of the platen but in advance thereof. The knife and clamp 25 is angular in cross-section to more securely retain the forms between it and the bar 9, and has a front cutting edge 26 against which the forms may be drawn and severed after being pulled forward beyond the writing area of the platen. It may be noted in passing that this handling of the form is facilitated by the form of the front bar 9 which drops at its center as shown in Figure 3 to facilitate the gripping of the front ends of the forms located under the forwardly extended portion of the clamp and cutter 25.

The form clamp and knife 25 is carried by swinging arms 27, fixed to the shaft 22, to which is also fixed rearwardly extending bifurcated arms 28, and depending retracting arms 29 urged in one direction by retracting springs 30. The springs 30 are connected at their rear ends to platen raising or elevating levers 31 of bell crank form, carried by a fixed transverse shaft 32, below the rear end of the platen. At the ends of the levers 31, opposite the points of attachment of the springs 30, are mounted platen supporting rollers 33 which engage the underside of the platen and support the rear end thereof in elevated position against the rear platen clamps 17 under normal or writing conditions.

Figure 5:
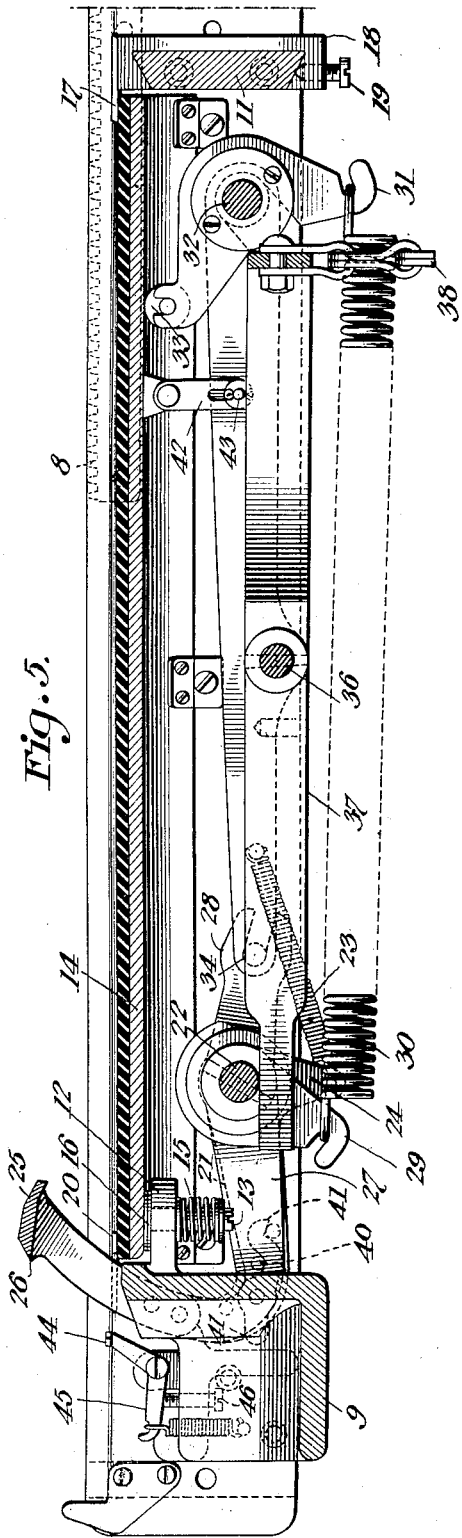
Figure 5 is a view similar to Figure 3 with the pedal operated to release the combined paper clamp and knife.
Figure 6:
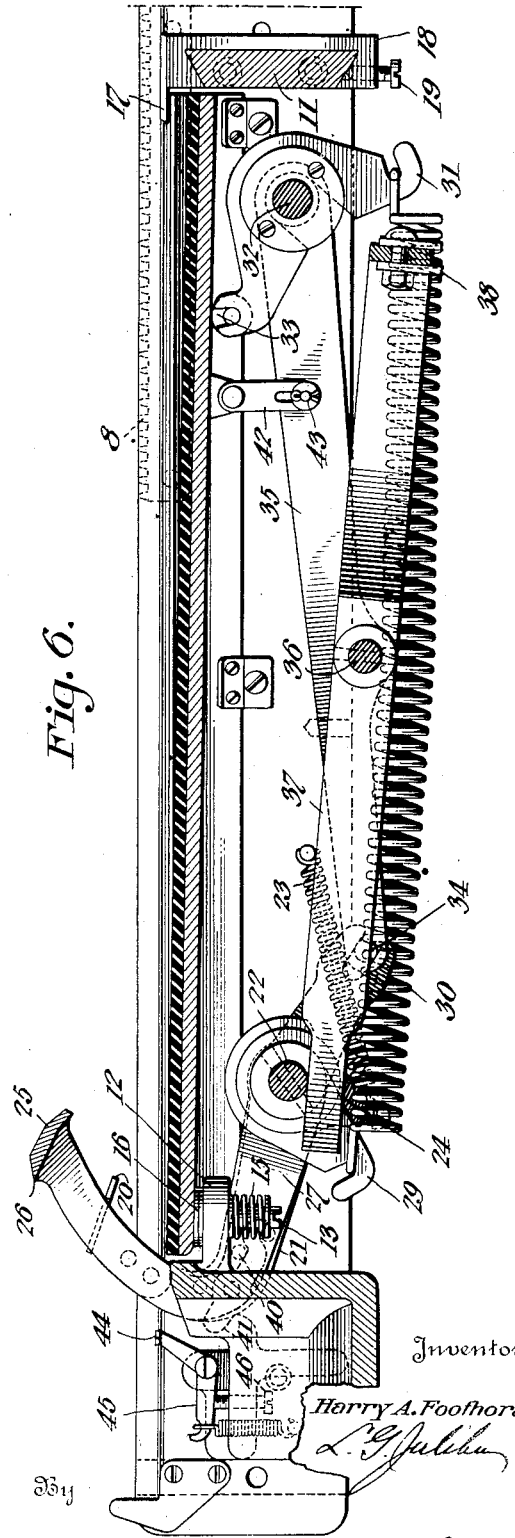
Figure 6 is a similar view with the operation extended to elevate the front platen clamps and to lower the platen from the rear clamp.

Mounted to swing from the shaft 32 and having a slot and pin connection 34, with the arms 28, are a pair of levers 35 connected intermediate of their ends by a transverse bar 36 on which is pivoted a bail 37 having its front ends extended under the shaft 22. The front end of the bail 37 is connected as by a chain 38 to a treadle 39, mounted in the pedestal 2. It will now be seen that as the operator depresses the treadle the bail 37 will be pulled down, with the shaft 22 acting as a fulcrum and the bar 36 serving to apply power to the arms 35 for the purpose of depressing the latter, rocking the shaft 22 through the medium of the arms 28, and causing the form clamp and cutter 25 to be elevated as the arms 27 are swung upward to a position sufficiently elevated (see Figure 5), to permit the operator to grasp the front ends of the work strips preparatory to drawing the same forward. Obviously, however, before the operator can draw the sheets forward, the release of the front and rear platen clamps must be effected. The front clamps 20 are released by swinging the arms 21 to elevate the clamps from the platen. For this purpose the arms are provided with pins 40 engaged by latches 41 on the arms 27 after predetermined movement thereof. After a predetermined movement of the knife has been effected (see Figure 5), the latches 41 will engage the pins 40 and continued movement of the arms 27 will cause the arms 21 and the front clamps 20 to be elevated against the resistance of the springs 23. The provision of pivoted latches 41 makes it possible, if desired, to avoid the release of one of the clamps 20 while the other clamp is operated in the manner described. As will hereafter appear, it is sometimes desirable to record on two sets of work sheets or forms located side by side on the platen. If it is desired to feed one only of these sheets or sets of sheets, the other sheet or set may be held securely and undisturbed by simply swinging the operating latch 41 of one of the clamps 20 to an inoperative position, as indicated in Figure 16, so that when the arm 27, carrying said latch, reaches the clamp operating position, the latch will not engage the pin 40, but will pass on and leave the clamp in its depressed position as the knife continues to rise and carries with it the clamp 20 at the other side of the platen. The release of the rear clamps 17 is effected by the depression of the platen. To attain this end, links 42 are dropped from the platen and engage pins 43, extended inwardly from the arms 35. Normally the pins 43 are located in the upper ends of the links so that during the initial downward movement of the bail 37 to elevate the form clamp and cutter to the position shown in Figure 5, the pins 43 will idly transverse the links 42 and will reach the limit of their idle movement as the latches 41 are carried into contact with the pins 40. Therefore, after the clamp and cutter have reached the position shown in Figure 5, continued depression of the treadle 39 will cause the release of both the front and rear platen clamps 20 and 17 by raising the clamps 20 from the platen and by depressing the platen from the clamp 17. It will be noted that the upper edge of the frame bar 11 is dropped considerably below the plane of the clamp 17 and the normal writing plane of the platen so that the rear clamps will have open throats thru which the work strips may be freely fed when the platen has been slightly dropped away from the clamp 17.

When the knife 25 and front clamps 20 have been elevated it is desirable that some guiding means be provided in close association with the forms to guide the operator in drawing the forms forward to the exact point for cutting. For this purpose a pair of form gauges 44 are mounted on spring retained bell crank levers 45, the positions of which may be varied by adjusting screws 46. When the paper is drawn forward the gauge fingers 44 extend over the edges thereof and guide the operator in drawing the paper forward to the exact extent to insure the severing of the forms with exactness when the knife 25 has been dropped and the forms are cut along the cutting edge 26 thereof.

Beyond the opposite sides of the platen frame, carbon rolls 47 and 48 are mounted on carbon roll shafts 49, rotatable in front and rear bearing brackets 50 and 51. The rolls 47 are wound upon cores 52 having securing clips 53, by means of which the ends of the carbon webs 54 are attached to the cores. The cores 52 are prevented from turning on the shafts by the squared or polygonal contour of that portion of the shafts within the cores, the bores of which correspond in contour to the polygonal contour of the shafts. At the opposite ends of, the rolls 47, guide flanges 55 are secured to the carbon roll shafts to guide the carbon and insure smooth winding or unwinding thereof.

To facilitate the removal of the carbon roll shafts, the rear bearings 51 are mounted to swing on horizontal axis 56 (see Figure 9), so that the shafts may be tilted (see Figure 11), to effect the withdrawal of the front ends thereof from the front bearings 50, provided with spring latches 57, which normally hold the shafts in the front bearings and engage angular grooves 58 in the shafts to retain the latter against endwise movement while permitting rotation thereof. It will be observed that these bearing latches 57 oppose frictional resistance to the rotation of the shaft to prevent slacking of the carbon and this resistance may be increased to any desired degree by cramping the rear bearings 51 on the shafts by means of clamping screws 59 provided for this purpose (see Figure 9). The carbon webs 54 are led from the carbon roll beyond one side of the platen to the roll at the other side thereof as will clearly appear from Figures 9 and 10, it being understood that a number of piled webs are wound from one roll to the other by the manipulation of thumb wheels 60 on the front ends of the shafts. Those portions of the webs which extend over the platen are interleaved with the paper webs a, and those portions of the carbon webs extending between the platen and the rolls are led thru longitudinal openings, or carbon throats 61, in the side bars of the platen frame, and over carbon guides 62 secured to the side frame members and extending at an upward angle from the bottoms of the openings 61 to the writing plane where they are rounded, as indicated at 63, to guide the carbon smoothly at the points where the plane of the carbon changes from the horizontal to the oblique in its passage from the platen to the spools. As the carbon becomes worn it is merely necessary to displace the used portion and replace it by a fresh unused portion of the web by turning one of the carbon roll shafts to wind the carbon from one roll to the other.

It some times happens that it is not desirable to use both carbon roll shafts. This, for instance, is true when the character of the work being done necessitates the cutting out of a considerable portion of the carbon, when it is desired that certain portions of the original record printed on the top sheet shall not be transferred to the copy sheets or certain of them. To meet this contingency, a carbon clamp 64 is pivoted at its rear end to the outside of the platen frame, preferably at the right-hand side of the machine. This clamp is of spring metal and has a normal outward flexure, which when overcome, forces the clamp close against the side of the frame and permits its front end to be retained by a catch 65. In order to release the clamp 64, it is merely necessary to elevate its front end from the catch, whereupon the clamp will spring outwardly and release the carbon, which after adjustment is again retained by the clamp, the lower edge of which constitutes a carbon cutter 66 by means of which the used portion of the carbon may be severed.

The set-up shown in Figure 7, is designed for what is know as the superfold paper strips. This is merely a series of paper webs folded back and forth as a unit in a box or receptacle as indicated in Figure 1ª, the strip or web in that figure, however, being of the fanfold form in which each strip or layer is connected along a longitudinal fold to the adjacent layer; the difference between the superfold, indicated in Figure 7, and the fanfold shown in Figure 1ª, being the omission of the longitudinal folds and, therefore, the complete detachment, one from the other, of the webs. It will be noted, however, that in either case the webs or strips of paper, as they come from the box, will be somewhat creased along the lines of the transverse folds and when transverse carbons are employed, in inter-leaved relation to the paper, the rear edges of the carbon sheets must serve to separate the paper sheets and break down the transverse folds or creases therein as the paper is drawn forward. It has been found in practice that this tends to mutilate the carbon and is also ineffective to fully break down the creases so that the paper will lie flat. It is, therefore, proposed to mount a web smoothing and separating device 67 in rear of the platen to break down the folds in the paper and to separate the webs just before the rear edge of the carbon is reached. In Figure 8 it will be noted that as the superfold paper strips pass up from the receptacle, they are led over a guide roller 68, provided with adjustable flanges 69, and thence pass horizontally through the smoothing and separating device 67 and over the platen in inter-leaved relation with the transverse carbon, with the ends of the strips clamped against the front frame bar and with their side edges guided and retained by the front and rear platen clamps. The smoothing device 67 consists of a series of separating and smoothing plates 70, extended from side to side of the frame, and carried by supports 71, pivoted at 72 to the side bars of the frame to permit the smoothing device to have slight rocking movement, limited by stop 73 extended from the supports 71 and engaging apertures 74 in the frame. As the paper passes between the plates 70, the transverse folds or creases therein will be broken down and the webs will be effectively separated to permit the paper to feed smoothly and lie flat against the platen without tending to mutilate the carbon or to smudge the paper.

In Figure 15 is shown a double superfold set-up, two sets of superfold strips being led over the platen side by side from separate receptacles and a separate guide roll 75, having adjustable flanges 76, being provided for one of the sets of strips in advance of and in a somewhat lower plane than the roll 68 over which the other superfold strips are passed. It is desirable to provide a separate guide roll for each set of paper webs, because the latter may be fed at different times and this set-up will also illustrate the reason why provision is made for operating one of the front platen clamps independently of the other since this enables one set of strips to be released and fed while the other set is securely held by its front platen clamp, against accidental displacement.

In Figure 17 is shown a set-up for handling a wide fanfold paper strip, which as we have seen, is a strip including a number of superposed layers connected by opposite longitudinal folds. There are several ways of handling these fanfold strips. Sometimes it is desired that when the original and carbon copies of a form are severed from the strip they shall remain connected, but disconnected and distributed by a subsequent operation or perhaps by a person other than the operator of the machine. In this event, of course, the longitudinal edges of the fanfold strip prevent the use of a continuous transverse carbon and it is therefore necessary to employ what are known as floating carbons located within the opposite folds of the strip and retained at their rear ends. Again it is sometimes desired to employ fanfold strips because of the maximum accuracy of form registration, but it is not desired that the original and copies of the printed form be retained in connected relation when severed after the form has been filled out. In these circumstances provision is made for slitting the fanfold strip along its opposite longitudinal folds and when this is done it is obvious that either the floating carbons or the continuous transverse carbon may be employed. To meet these varying requirements the platen is so equipped that either the transverse carbon or the floating carbons may be used and the fanfold slitted or not, as desired.

Figure 4:
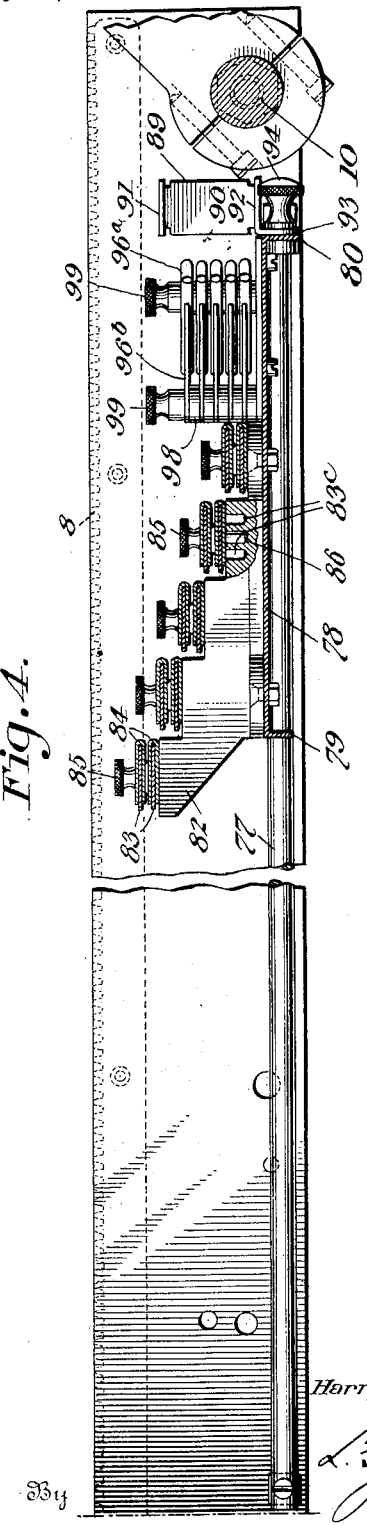
Figure 4 is a sectional view of the rear end of the frame and parts mounted therein.

Mounted on the side members of the main frame in rear of the intermediate frame bar 11, are a pair of carrier guides 77 (see Figures 4 and 17), on which is slidably mounted a combined carbon and slitter carrier 78, having front and rear flanges 79 and 80, provided with openings 81 for the reception of the guides 77, along which the carrier or carriage 78 moves or floats. At opposite sides of the carrier 78 are mounted stepped supporting blocks 82 for the carbon fingers 83, which are thus disposed in progressive planes to permit them to alternate with the layers of the paper strip. The floating carbons b are secured at their rear ends to their fingers 83 by pivoting carbon clamps 84. If a greater number of carbons are needed, two of them may be mounted on each of the steps of the supporting blocks as indicated in Figure 18. Each of the fingers 83 has a pin 85 which acts as a pintle for the carbon clamp 84 and is designed to be extended into an opening or socket 86 in the step, and when two fingers are employed the pin 85 of each finger is engaged by the bifurcated end 87 of another.

To accommodate different widths of paper, one or both of the supporting blocks 82 may be laterally adjustable, an extra pair of screw holes 88, being indicated in Figure 18, for the securing screws of one of the blocks. At the rear side of the carriage 78 are mounted adjustable paper guides 89, preferably bent to form side guides 90, top and bottom flanges 91 and 92 which extend above and below the paper, and a slotted shank 93, which latter is imposed against the rear flange 80 of the carriage and retained in adjusted positions by a set screw 94. A projection 95, extended from the guide into a slot in the flange 80, prevents the guide from swinging from the set screw as an axis.

In addition to the minor adjustment of the paper guides 89, they are designed to be relatively spaced in correspondence with the carbon finger supporting blocks 82 which also act as paper guides. Therefore, as shown in Figure 18 the flange 80 is provided with an extra pair of openings for the accommodation of the set screw 94 and retaining lug 95 of one of the guides. Between the paper guides 89 and the carbon supporting blocks 82 are mounted at each side of the carriage 78, vertical series of slitters 96, which, as the fanfold paper strip is drawn forward, are designed to slit the paper along the lines of the longitudinal folds thereof in the manner indicated in Figure 37.

Referring more particularly to Figure 18, the slitters are in the form of rearwardly and inwardly inclined slitting bars 96$^a$, carried by plates 96$^b$, apertured to receive two upstanding posts 97, and separated by washers 98, preferably secured to the undersides of the plates. When the slitters have been piled upon the posts 97, they are retained by thumb nuts 99, screwed upon the upper ends of the posts. The supporting posts 97 for each set of slitters, rise from a base plate 100, having studs 101 extended downwardly through slots 102 in the carriage 78, clamping nuts 103 being screwed upon two of these studs as shown in Figure 20, to clamp the base plate 100 in position after the slitters have been adjusted the distance permitted by the slots 102. In addition to this minor adjustment of the slitters, the carriage 78 is provided with a separate series of slots 102, which permit one of the slitter sets to be relocated just as we have seen that one of the carbon supporting blocks and the corresponding paper guide are capable of relocation somewhat near the center of the carriage. It will be noted that the slitter bars 96 at opposite sides of the carriage 98, extend rearwardly in convergent relation and have their extremities turned back to prevent them from catching in the paper. These bars are inserted between the layers of the fanfold strip and they obliquely intersect the line of longitudinal paper folds so that as the paper is drawn forward, it is slitted before it reaches the carbon fingers.

I have shown the slitters assembled on the floating carbon carriage 78 and have indicated in Figure 23 that floating carbons may be associated with them on carbon fingers extended entirely across the carriage. This arrangement is entirely logical because if the fanfold is slit, either floating or transverse carbons are available though in this case the transverse carbon is usually preferred.

In Figure 32, for instance, is shown a set-up for a narrow fanfold strip which is to be slit and used in connection with carbon fingers, extended entirely across the paper. In Figure 33, the set-up is for a ten copy fanfold strip which is not to be slitted, so that when the recorded portion of the strip is detached the original and ten copies of the form will remain connected. It will be noted that the slitters are omitted entirely, and as will be clearly seen from Figure 34, it is necessary in this instance that each carbon finger shall terminate within the fold of the paper. In other words, where the fanfold is used without slitting, the carbon fingers can be supported at one end only since the opposite end will be located within a closed fold. This will be clear from a consideration of Figure 31 and Figure 24, in which latter the carbon fingers 83ª, each of which is supported at one end only, are provided with a pair of lugs 83ᵇ which extend into openings 83ᶜ in the supporting blocks.

When floating carbons are employed, the use of comparatively long sheets, which may be adjusted from time to time to allow every portion of the carbon to be used, is contemplated. To this end the carbon carriage 98 is mounted to float or move along its guides so that as the front portion of the carbon is used up all of the carbon sheets may be drawn forward and severed.

To facilitate this carbon adjustment, a floating carbon carriage stop 104 is adjustably mounted on a carriage rack 105, extending along one side of the platen frame (see Figures 1, 25, 26 and 27), and engaged by a spring urged latch 106, carried by the stop. The stop 104 also carries a pointer 107 which transverses a scale 108, by means of which the stop may be advanced and relocated to arrest the carbon carriage after predetermined forward movement thereof to permit the predetermined length of carbon to be severed and replaced by unused carbon opposite the platen.

The precise manner in which contact is made with the carbon carriage stop 104 by the carriage may be varied, but preferably the stop is extended as indicated in Figure 27 to provide an abutment 108, supported by one of the carriage guides immediately in advance of the carriage. When the floating carbons are employed the fanfold or other strip is carried up from the receptacle and over the rear frame bar 10 between the adjustable guides 10ª, said guides preferably having extensions 10ᵇ for the support of a second bar 10ᶜ, provided with one or more adjustable guides 10ᵈ, and over which the second paper strip is led in those applications of the invention which contemplate a plurality of paper strips, as, for instance, strips of different width as shown in Figure 28. In lieu of the carbon carriage slitters, etc., the paper webs may be led over the platen from paper rolls 109, mounted in the paper roll frame 110 equipped with guide rollers 111 over which the paper may be fed from the rolls to the platen in a manner which is not specifically a part of the present invention.

It is thought that from the foregoing, the construction and mode of application of the invention will be fully comprehended, but I wish to reserve the right to effect such modifications and variations of the illustrated structure as may come fairly within the scope of the protection prayed.

What I claim is:—

1. The combination with a frame and platen, said platen being depressible at its rear end, a fixed clamp co-acting with the rear end of the platen, movable clamps co-acting with the front end of the platen and with the frame respectively, and means for depressing the platen and for operating the movable clamps.

2. The combination with a platen and a frame, of a normally active work clamp co-acting with the frame in advance of the platen, a swinging arm supporting said clamp, a normally active clamp co-acting with the platen, a second swinging arm supporting said clamp, means for swinging one of said arms to move its clamp to inactive position, and means for causing the same to operate the other arm.

3. The combination with a flat platen and a plurality of normally active work clamps, means for operating said clamps in succession to release the work, and means for disconnecting one of the clamps from the operating means.

4. The combination with a flat platen and a pair of work clamps, of separate arms for operating the clamps, and a connecting device for causing one arm to operate the other and movable to an inoperative position.

5. The combination with a platen, of a pair of work clamps located at the front end thereof, and means for operating one or both of said clamps.

6. The combination with a frame and platen, of two work clamps adjacent to the front end of the platen, a work clamp co-acting with the frame, and means for operating the last named work clamp and one or both of the platen clamps.

7. The combination with a frame and a depressible platen, of a work clamp and cutter co-acting with the frame in advance of the platen, and means for raising the clamp and depressing the platen.

8. The combination with a frame and platen, of a platen elevating lever, a work clamp, a clamp elevating lever retracting springs connected to said levers and active to hold the platen elevated and the clamp depressed, and a platen depressing lever operatively connected to both the platen and the clamp to depress the platen and elevate the clamp.

9. The combination with a platen, of a combined work clamp and cutter movable away from the work, a work gauge indicating the cutting line of the cut when the cutter is moved away from said work, said gauge being movable to prevent interference with the cutting operation.

10. The combination with a platen and a paper cutter movable to and from its operative position, of a spring retained work gauge disposed adjacent to the cutter and indicating the line of the cut, and means for adjusting the work gauge.

11. The combination with a depressible platen, a frame and a movable work clamp with a pair of shafts below the platen, a clamp operating lever mounted on one shaft and a platen operating lever mounted on the other shaft, a spring connecting said levers, a platen depressing lever mounted on one shaft and arranged to operate the clamp operating lever, and a connection between the platen and the platen depressing lever, said connection permitting limited lost motion of the depressing lever to cause the operation of the clamp prior to the depression of the platen.

12. The combination with a platen, of paper guides located at the rear end thereof to act as guiding and gauging means adapted to engage the side edges of a longitudinal work sheet or the rear edge of a loose work sheet or leaf, and work clamps extended from said guides and disposed to engage the side margins of a longitudinal sheet or the rear margin of a loose leaf.

13. The combination with a platen frame and flat platen, of carbon roll shafts located at opposite sides of the frame and bearings for each shaft removably mounted on the frame, one of said bearings being pivotally mounted and the other having a latch for the retention of the shaft.

14. The combination with a platen frame and platen, of carbon throats or openings formed in the side walls of the frame, inclined carbon guides extended from said openings to the opposite edges of the writing surface of the platen and means for supporting carbon rolls beyond the opposite sides of the frame.

15. The combination with a platen, of a paper separating and smoothing device consisting of a series of flat plates spaced apart in relatively fixed position between which the paper strips are led to be smoothed and separated in their passage to the platen and having rocking movement whereby their edges grip the strip during passage of the latter to said platen.

16. The combination with a carbon carriage for manifolding machines, of carbon supporting devices located at the front side of the carriage, paper guides located at the rear side of the carriage, and intermediate slitter groups the guides being adjustable with respect to the slitter group to center the paper relative thereto.

17. In combination, a work supporting platen, a cutter bar, a pair of line gauges arranged respectively to overlie opposite ends of the cutter bar, and spaced slightly therefrom, and operating mechanism for raising the cutter bar from the work and from beneath said gauges.

18. The combination with a frame and a flat platen, of a carbon carriage movable on the frame toward and from the platen, means for attaching a carbon sheet to the carriage to move the same as said sheet may be drawn over the platen, and settable means for arresting forward movement of the carriage to determine the length of carbon drawn over the platen.

19. In a device of the character described, a frame, a flat platen over which a work sheet may be advanced, normally active work clamps mounted on the frame and arranged one in advance of another to clamp the forward end of the sheet, and clamp releasing mechanism acting to release the advanced clamp to permit the end of the sheet to be grasped and to thereafter completely release the sheet to permit it to be drawn over the platen.

20. In a machine of the character described, a frame, a flat platen over which a work sheet may be advanced, a cutter bar adjacent one edge of the platen and coacting with the frame to clamp the forward end of the sheet, a pair of line gauges overlying opposite ends of the cutter bar, clamps coacting with the platen, and operating mechanism common to the cutter bar and clamps and operative to first raise the cutter bar from under the gauges and to subsequently operate the platen clamps to release the work.

21. In a machine of the class described, a platen frame, a platen movable thereon, a cutter bar coacting with the frame, front and rear platen clamps, and means operative to move the platen, the cutter bar and a clamp to release the work.

22. The combination with a rectangular work supporting platen, of corner clamps for engaging the platen to clamp the work thereagainst, and means for releasing the clamps successively in pairs.

23. The combination with a rectangular work supporting platen, of corner clamps for engaging the platen to clamp the work against opposite edges thereof, and mechanism for releasing the clamps successively in pairs and operating to move one pair of clamps away from the platen and the platen away from the other pair of clamps.

24. The combination with a rectangular work supporting platen of front and rear corner clamps engaging the platen to clamp the work thereto, and mechanism for releasing the clamps successively in pairs and operating to move the front clamps away from the platen and the platen away from the rear clamps.

25. The combination with a frame and a flat work supporting platen, of a clamp coacting with the frame to clamp the work thereto, front and rear work clamps engaging the edges of the platen, and clamps releasing means operating to release the frame clamp and the front and rear clamps in succession and in the order named.

26. The combination with a frame and a rectangular work supporting platen, of a work clamp coacting with the frame to clamp the work thereto, front and rear corner clamps coacting with the platen to clamp the work thereto, and clamp releasing means operating to release the frame clamp and the front and rear clamps in succession and in the order named.

27. The combination with a depressible flat platen, of a combined cutter and clamp adjacent one edge of the platen in non-interfering relation with respect to depression thereof and including a cutter element movable away from the work, and a work gauge indicating the cutting line of the work when the cutter is moved away from said work.

28. The combination with a work supporting platen, of a cutter bar adapted to overlie the work, and a pair of gauges arranged respectively to overlie opposite ends of the cutter bar and yieldingly mounted for movement toward the bar to permit the work to be folded back over said bar in cutting operations.

29. The combination with a depressible flat platen, of a plurality of work clamps overhanging one edge of the platen and limiting upward movement thereof, said clamps being adjustable to accommodate different widths of work therebetween.

In testimony whereof I affix my signature.

HARRY A. FOOTHORAP.